UNITED STATES PATENT OFFICE.

ALFRED O. TATE, OF TORONTO, ONTARIO, CANADA.

ART OF REJUVENATING STORAGE BATTERIES.

949,506.  Specification of Letters Patent.  Patented Feb. 15, 1910.

No Drawing.   Application filed May 12, 1908.  Serial No. 432,391.

*To all whom it may concern:*

Be it known that I, ALFRED O. TATE, a subject of the King of Great Britain, and resident of the city of Toronto, Province of Ontario, Dominion of Canada, have made a new and useful Invention in the Art of Rejuvenating Storage Batteries, of which the following is a specification.

My invention is directed especially to an improved method or process of affording increased life to storage batteries generally and it has for its object, to restore the individual cells of such batteries to their normal or original efficiency, after the individual anode and cathode plates or strips which support the active material have been so acted upon by the current in charging, discharging and recharging as to materially deplete or diminish their efficiency.

In the operation of electric storage batteries, particularly of the leaf-lead type, the life thereof under normal conditions of usage is determined broadly by either one of two prime factors (*a*) electro-chemical disruption; (*b*) oxidation of the anode conductor. With plates of the exposed oxid type where the active material is packed in an open metallic grid, or formed on the face or faces of an exposed plate, the oxid is maintained in a relatively loose or unstable condition, owing to its expansion and contraction in response to the phenomena of electrical charge and discharge. The circulation of the liquid in which these plates are immersed, reinforced by the disruptive action of the gases liberated, produces a constant loss of oxid through detrition and a consequent decrease of available energy to a point where renewal of the active material must be effected. This point of renewal is regarded as marking the life of the cell and is reached through what I term electro-mechanical disruption. With plates of the inclosed oxid type, that is to say, plates that are provided with diaphragms, separators, or any means whereby the escape of active material is prevented, the life of the cell must be determined by the period necessary to reduce the metallic anode conductor to an oxid.

As this process progresses during use the resistance of the cell rises for the reason that the oxid is a relatively poor conductor of electricity and there is a consequent decrease of available or useful energy to a point where renewal of these parts must be effected. There is also an obvious decrease of mechanical strength, due to the substitution of an unstable oxid for a metallic support, and this period delimited by the point of renewal denotes what I may term the greatest expectancy of electrode life that can be contemplated in the storage battery art, in so far as it has been developed in practice up to the present time.

A further object of my invention is to extend the life or period of useful duration of the parts constituting a storage battery cell by an electro-chemical process that is well understood in the art, but which heretofore has not been employed for this purpose, in so far as I am aware.

My novel method or process is peculiarly adaptable for use with the novel bifunctional storage battery plates disclosed in U. S. Patents No. 880,420; No. 880,421; No. 880,422; No. 880,423; No. 880,424 and No. 880,425, granted to me on the 25th day of February, 1908, and U. S. Patent No. 926,710, granted to me on the 29th day of June, 1909, in all of which is disclosed a method or process of employing films of oxid instead of masses, and sectional conducting strips or ribbons of metallic lead instead of relatively heavy conducting plates or sheets, as now most commonly practiced in the storage battery art. In estimating the life of any one of my bifunctional plates it is obvious that its duration must be determined by the period required to reduce the metallic anode conductors to lead oxid, and that this life term depends upon the rates of charge and discharge maintained during their operation, for the reason that the transmutation of the metallic lead into lead oxid in this manner is in direct proportion to the quantity of current that is caused to flow through the cell within a given period.

The relatively thin layers or films of oxid employed in my bifunctional plates coupled with the method whereby the plate is subdivided to permit the freest possible current flow between the anode and cathode segments have enabled me to produce the following remarkable result, it being well understood in the storage battery art that in recharging a period of five or six hours must be apportioned for the purpose.

I have discharged one of my bifunctional plates of a capacity of about 25 ampere hours on an eight hour discharge rate, to zero; then brought it up to full load 2.4 volts in a period of thirty-four minutes, using a current of fifteen amperes, and upon again discharging it at a three ampere rate found its capacity unimpaired and its condition in all respects absolutely normal, and I have repeated this with sufficient frequency to show that beyond the more rapid oxidation of the anode conductors no undesirable result ensues. It is obvious that were these high rates of charge and discharge maintained in practice, while the cell would perform more work within a given period, its life would be much shorter than if lower rates were employed. In order to obviate any disability that might attach to the too frequent recurrence of these renewal periods I propose adopting an electro-chemical method of renewal of which the following is a description. When a cell has been worked to a point where the anode sections of the plates have commenced to lose their efficiency as conductors—a point that will be readily indicated by measuring the internal resistance of the cell—I propose running it down to zero and reversing it; that is to say, I transform the cathode sections into anodes and the anode sections into cathodes. The effect of this reversal is to transform the oxidized anode conductors and their accompanying applied oxid films into metallic lead, thus restoring the impaired conductivity of this section of the cell, and to reduce the metallic lead films of the cathodes to an oxid. It will be seen that these reversals may be repeated at indefinite intervals for the reason that the metallic lead of the cathode is oxidized from its outer surface toward its center and therefore by proper regulation of the process a metallic lead core can always be maintained or reproduced even though the original metallic conductors have been wholly reduced to an oxid. This reproduction of a metallic core is feasible, owing to my method of packing and confining the oxid in a manner whereby its contact with some part of the main conductors of the unit is always maintained.

Having thus described my invention what I claim and desire to secure by Letters Patent of the United States is—

1. The method or process of rejuvenating or renewing a depleted storage battery cell which consists in reducing the oxidized anodes thereof to metallic lead and in simultaneously oxidizing the metallic lead cathodes thereof until said anodes and cathodes shall have assumed their normal or original efficiency.

2. The method or process of rejuvenating or renewing a depleted storage battery cell of the applied oxid type which consists in reducing the oxidized faces of the metallic anodes and their applied oxid to metallic lead and in simultaneously oxidizing the spongy applied metallic lead of the cathodes until said anodes and cathodes shall have assumed their normal or original efficiency.

3. The method or process of rejuvenating or renewing a depleted storage battery cell which consists in electrolytically reducing the oxidized anodes thereof to metallic lead and in simultaneously electrolytically oxidizing the metallic lead cathodes until said anodes and cathodes shall have assumed their normal or original efficiency.

4. The method or process of rejuvenating or renewing a depleted storage battery cell of the applied oxid type which consists in electrolytically reducing the oxidized anodes and their applied oxid to metallic lead and simultaneously electrolytically oxidizing the spongy applied metallic lead of the cathodes until said anodes and cathodes shall have assumed their normal or original efficiency.

In testimony whereof I have signed my name to this specification in the presence of two subscribing witnesses.

ALFRED O. TATE.

Witnesses:
C. J. KINTNER,
M. F. KEATING.